US008261348B2

(12) United States Patent
Goto

(10) Patent No.: US 8,261,348 B2
(45) Date of Patent: Sep. 4, 2012

(54) RECEPTION APPARATUS

(75) Inventor: Ryo Goto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 282 days.

(21) Appl. No.: 12/670,850

(22) PCT Filed: Jul. 29, 2008

(86) PCT No.: PCT/JP2008/063585
§ 371 (c)(1),
(2), (4) Date: May 26, 2010

(87) PCT Pub. No.: WO2009/017119
PCT Pub. Date: Feb. 5, 2009

(65) Prior Publication Data
US 2010/0229215 A1     Sep. 9, 2010

(30) Foreign Application Priority Data
Jul. 30, 2007   (JP) .................................. 2007-197505

(51) Int. Cl.
*H04L 29/00*      (2006.01)
*G06F 21/00*      (2006.01)
(52) U.S. Cl. ........................................................ 726/22
(58) Field of Classification Search ...................... 726/22
See application file for complete search history.

(56) References Cited

U.S. PATENT DOCUMENTS

| 6,788,879 B1* | 9/2004 | Nozawa ...................... 386/203 |
| 2005/0125780 A1* | 6/2005 | Rose et al. .................... 717/140 |
| 2006/0112336 A1* | 5/2006 | Gewickey et al. ........... 715/716 |
| 2006/0277607 A1* | 12/2006 | Chung ........................... 726/27 |

FOREIGN PATENT DOCUMENTS

| JP | 2001-251296 | 9/2001 |
| JP | 2003-022007 | 1/2003 |
| JP | 2003-249932 | 9/2003 |

OTHER PUBLICATIONS

International Search Report for PCT/JP2008/063585, mailed on Sep. 2, 2008, 2 pages.
Kaneko et al., Information Processing Society of Japan (2005) 33:211-216.

* cited by examiner

*Primary Examiner* — Matthew Smithers
(74) *Attorney, Agent, or Firm* — Duane Morris LLP

(57) ABSTRACT

A reception apparatus in accordance with the present invention is provided with a reception unit (11, 12) to receive a stream including a data signal, a display unit 17 for performing display based on the stream received, an authentication process unit 13 for authenticating a sender of the stream received, a signal separating unit 14 for separating the data signal from the stream received, a script detection unit 16 for detecting a script by analyzing the data signal separated, and a control unit 23 for controlling the display unit 17 to perform display based on the stream received, wherein the control unit 23 prohibits an input related to execution of the script in a case where the script is detected by the script detection unit 16 during an authentication of the stream. Thereby, the reception apparatus plays contents appropriately without inflicting either a disadvantage or stress on a user.

13 Claims, 19 Drawing Sheets

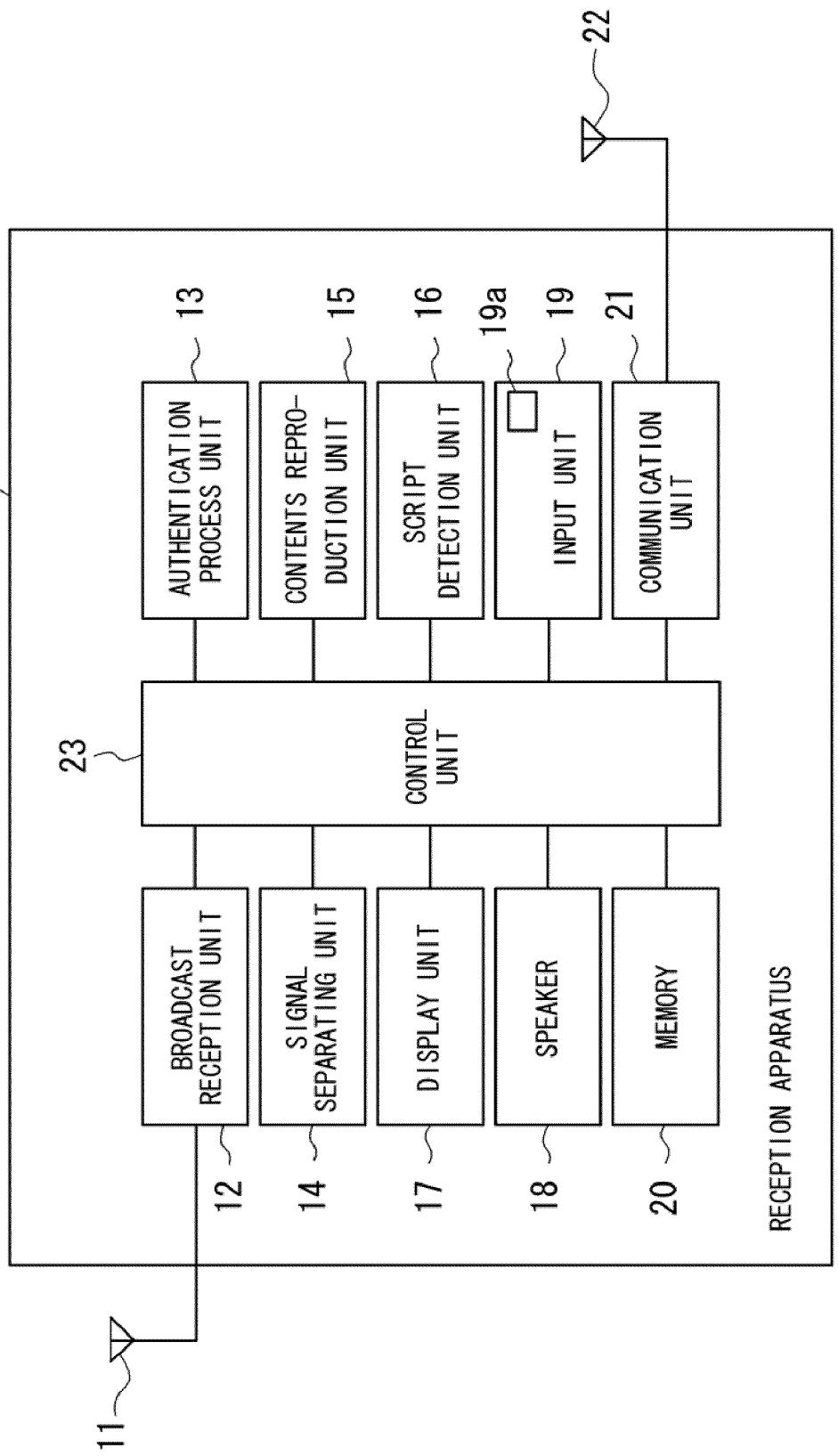

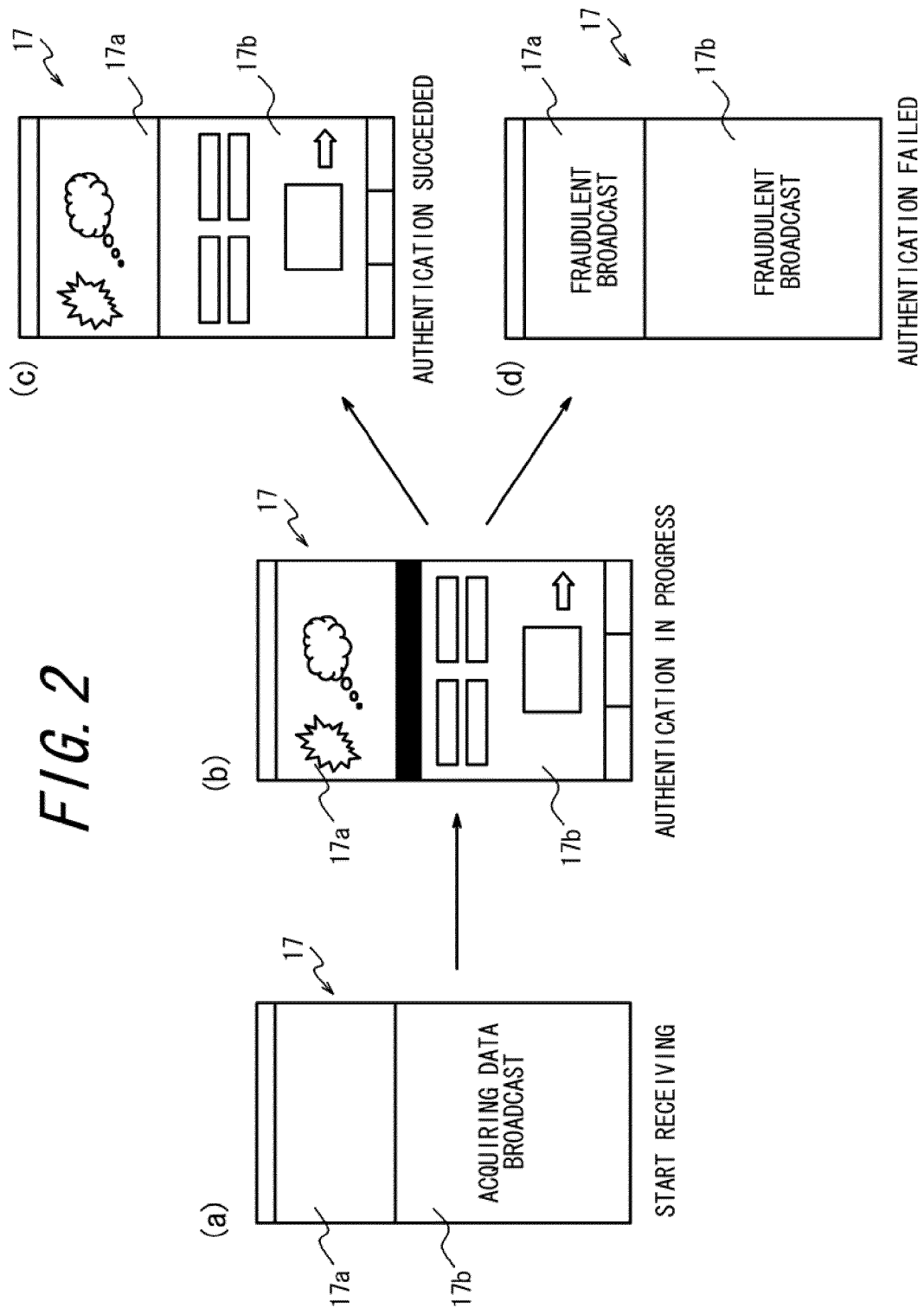

FIG. 3

```
<head>
<title>startup</title>
<script><![CDATA[ function onClick() {
 var id=document.currentEvent.target.id;
 if(id=="f1") {
  browser.launchDocument("http://hoge.jp/index.bml","cut");
 }else if (id=="f2") {
  browser.launchDocument("/80/0001/next.bml","cut");
 }else if (id=="f3") {
  browser.writePersistentString("f1","str");
 }
}

]]></script>

</head>
<body id="body">
 <div style="top:0px;left:0px;width:240px;height:300px;">
  <p style="left:10px;top:10px;width:230px;height:30px;">
   <a id="f1"onclick="onClick();">JUMP</a>
   </p>
   <p style="left:10px;top:40px;width:230px;height:30px;">
    <a id="f2"onclick="onClick();">NEXT PAGE</a>
   </p>
   <p style="left:10px;top:40px;width:230px;height:30px;">
    <a id="f3"onclick="onClick();">WRITE</a>
   </p>
  </div>
</body>
```

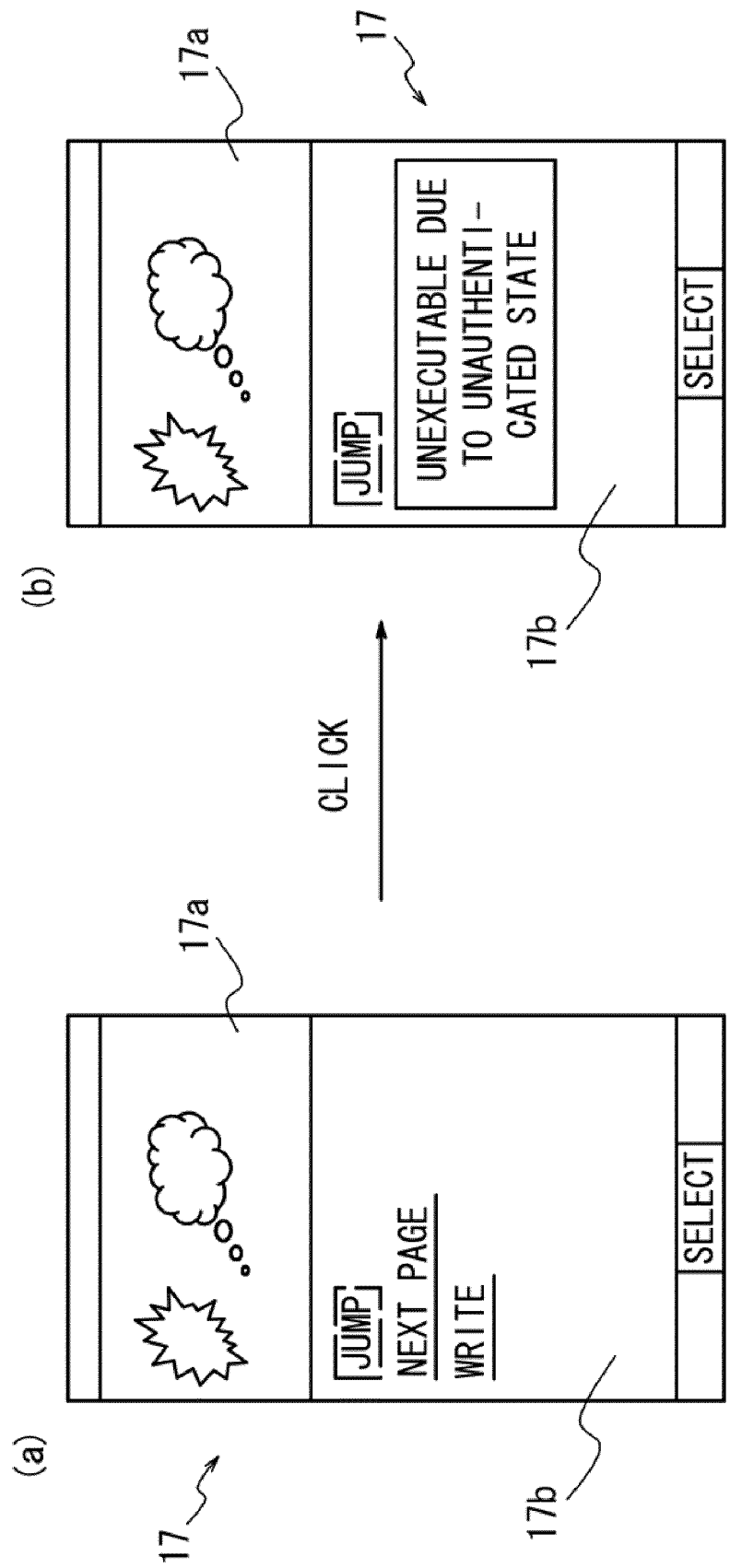

FIG. 6

| FUNCTION NAME | FUNCTION |
|---|---|
| X_DPA_mailTo | ACTIVATE MAIL APPLICATION |
| X_DPA_startResidentApp | ACTIVATE APPLICATION WITHIN TERMINAL (BROWSER ETC.) |
| X_DPA_phoneTo | MAKE PHONE CALL |
| X_DPA_writeSchInfo | WRITE IN DIARY |
| X_DPA_writeAddressBookInfo | WRITE IN ADDRESS BOOK |
| launchDocument("http: | JUMP TO LINKED (EXTERNAL) DESTINATION |
| epgReserve | RESERVE VIEW |
| writePersistentNumber | WRITE NUMBER IN MEMORY |

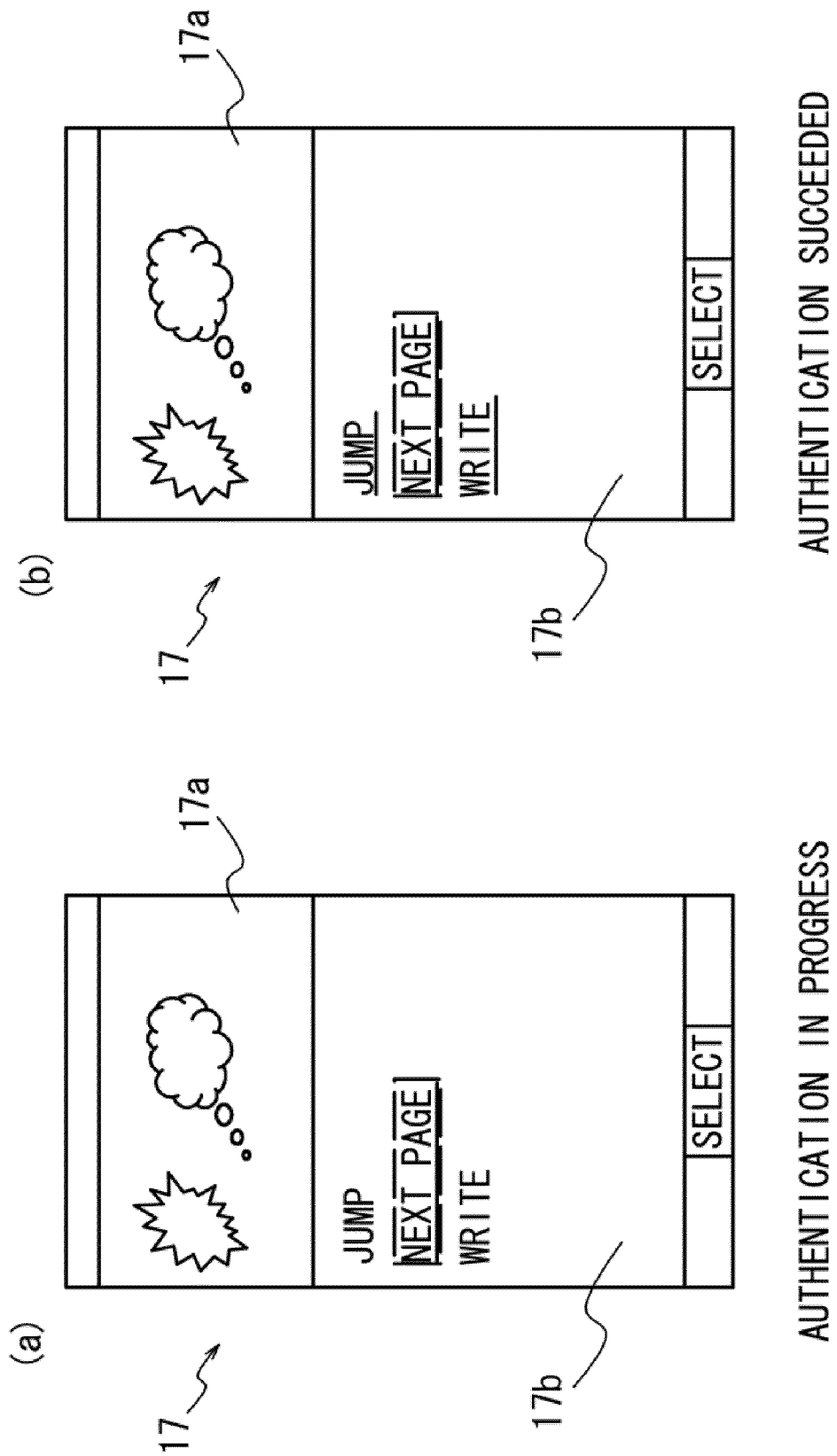

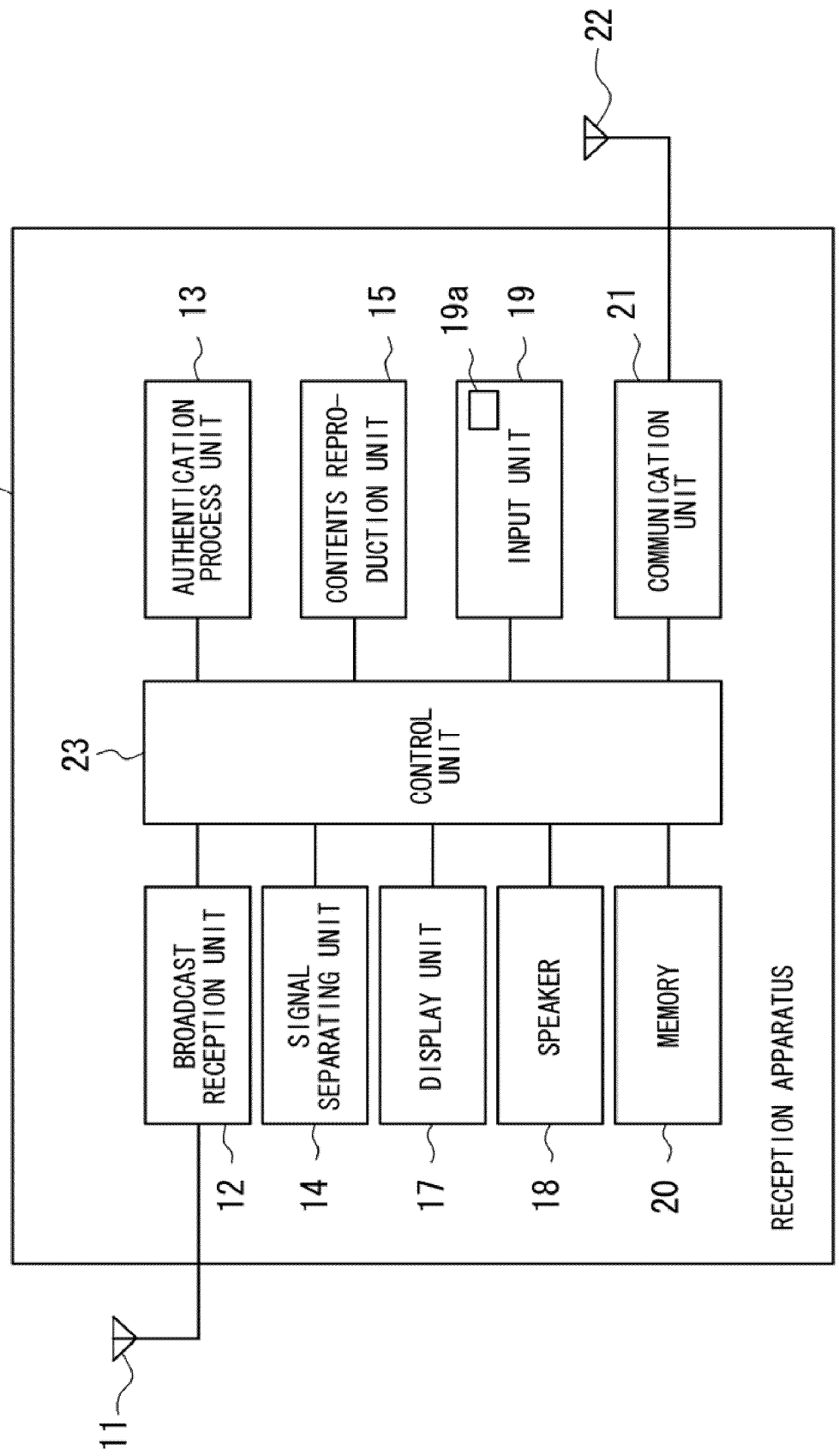

RECEPTION APPARATUS

CROSS REFERENCE TO RELATED APPLICATION

This application is a U.S. National Phase of International Application No. PCT/JP2008/063585 filed on Jul. 29, 2008, which claims priority to and the benefit of Japanese Patent Application No. 2007-197505 filed on Jul. 30, 2007, the entire contents of which are incorporated herein by reference.

TECHNICAL FIELD

The present invention relates to a reception apparatus for receiving a stream including a data signal.

BACKGROUND ART

A recent television broadcasting system, for example, can broadcast a number of program contents to viewers, as multi-channel broadcasting is developed along with a widespread use of digital broadcast. Also, the number of services for distributing video contents has been increasing along with a widespread use of the high-speed internet in the internet environment.

Adjunct data (for example, data broadcast in the digital broadcast) constituted of data signals are sometimes added to contents distributed by such a digital broadcasting system or a contents distribution service of the internet or the like. The adjunct data may include, for example, a script to execute an application (also referred simply to "Appri" hereinafter) such as e-mail or to jump to an external destination linked by a URL (Uniform Resource Locator: Internet Address).

Thus, with regard to the contents distribution service, it is necessary to ensure a security of the contents to a viewer. This is because it may happen that, for example, in contents distributed by contents distribution service provider, a legitimate contents stream being received is switched to an unintended stream by a malicious assailant, so that a user receives a fraudulent stream including a packet whose relationship with its previous or following packet is not guaranteed.

As for the digital broadcast, the reception apparatus may receive a fraudulent stream to which so-called "spoofing" is performed, with a falsified data broadcast in which interactive communication is possible, and image data and audio data both of which remain intact. In such a case, there is a concern that a user executes an application included in the data broadcast or a script to jump to an external destination believing that information should be safe as it is distributed by a trustworthy broadcast station, which may result in damaging the user seriously by phishing, viewing or recording programs tampered, undesired data written in a nonvolatile memory, and the likes.

Such problems may happen more often as a widespread of broadcasting type such as a contents distribution system (a so-called "Spot-cast") using weak radio waves, in particular, which is recently suggested and utilizes One-segment broadcasting of Digital Terrestrial Television.

Hence, in the contents distribution service, it is necessary to ensure the security of the contents. As one method, there is known a stream authentication which ensures legitimacy of a stream by adding a digital signature for authenticating a sender identification to the stream of contents transmitted by the sender and authenticating the sender by decrypting the digital signature with a public key of the sender (see Patent Document 1 and Patent Document 2, for example).

As described above, if a transmission apparatus transmits a stream of contents whose security is ensured by the stream authentication, the reception apparatus may refrain from playing the stream received until it is ensured to be legitimate (that is, during a process of authentication), which may prevent inflicting a disadvantage on the user.

Patent Document 1: Japanese Patent Application Laid-Open No. 2003-249932
Patent Document 2: Japanese Patent Application Laid-Open No. 2001-251296

SUMMARY OF INVENTION

Technical Problem

However, the stream authentication stated above ensures relationship of a packet with its previous or following packet constituting the stream of the contents. Thus, in order to ensure that the stream is legitimate (the stream is constituted of a series of packets with relationship therebetween being ensured) on a reception side, it is necessary to receive a certain number of packets to verify them, which takes a certain amount of time.

Therefore, with the reception device which refrains from playing the stream received during the process of the authentication as described above, the user, even if selecting a desired contents, cannot view the contents at all, which is stressful for the user.

Hence, it is an object of the present invention in consideration of such a circumstance to provide a reception apparatus capable of playing the contents appropriately without inflicting the disadvantage or stress on the user.

Solution to Problem

In order to achieve the above object, the present invention according to a first aspect is characterized in that a reception apparatus includes:
  a reception unit for receiving a stream including a data signal;
  a display unit for performing display based on the stream received by the reception unit;
  an authentication process unit for authenticating a sender of the stream received by the reception unit;
  a signal separating unit for separating the data signal from the stream received by the reception unit;
  a script detection unit for detecting a script by analyzing the data signal separated by the signal separating unit; and
  a control unit for controlling the display unit to perform display based on the stream received by the reception unit;
  wherein the control unit prohibits an input related to execution of the script when the script is detected by the script detection unit during authentication of the stream by the authentication process unit.

The present invention according to a second aspect is characterized in that a reception apparatus includes:
  a reception unit for receiving a stream including a data signal;
  a display unit for performing display based on the stream received by the reception unit;
  an authentication process unit for authenticating a sender of the stream received by the reception unit;
  a signal separating unit for separating the data signal from the stream received by the reception unit;

a script detection unit for detecting a predetermined script command by analyzing the data signal separated by the signal separating unit; and a control unit for controlling the display unit to perform display based on the stream received by the reception unit;

wherein the control unit prohibits an input related to execution of the predetermined script command when the predetermined script command is detected by the script detection unit during authentication of the stream by the authentication process unit.

Moreover, the present invention according to a third aspect is characterized in that a reception apparatus includes:

a reception unit for receiving a stream including a data signal;

a display unit for performing display based on the stream received by the reception unit;

an authentication process unit for authenticating a sender of the stream received by the reception unit;

a signal separating unit for separating the data signal from the stream received by the reception unit; and a control unit for controlling the display unit to perform display based on the stream received by the reception unit;

wherein the control unit restricts execution of a script included in the data signal separated by the signal separating unit during authentication of the stream by the authentication process unit.

The present invention according to a fourth aspect is characterized in that, in the reception apparatus of the third aspect, the control unit executes a process in response to an input to a data screen displayed on the display unit based on the data signal separated by the signal separating unit and, when there is a script in a course of the process, halts the process without executing the script.

The present invention according to a fifth aspect is characterized in that, in the reception apparatus of the third aspect, the control unit executes a process in response to an input to a data screen displayed on the display unit based on the data signal separated by the signal separating unit and, when there is a script in a course of the process and a predetermined script command is included in the script, halts the process without executing the script command.

The present invention according to a sixth aspect is characterized in that, in the reception apparatus of the third aspect, the control unit executes a process in response to an input to a data screen displayed on the display unit based on the data signal separated by the signal separating unit and, when there is a script in a course of the process and a predetermined script command is included in the script, suspends the process just before executing the script command.

The present invention according to a seventh aspect is characterized in that, in the reception apparatus of the sixth aspect, the control unit resumes the process suspended, when the authentication of the stream is succeeded by the authentication process unit.

The present invention according to an eighth aspect is characterized in that, in the reception apparatus of the sixth aspect, the control unit terminates the process suspended by force, when the authentication of the stream is failed by the authentication process unit.

The present invention according to a ninth aspect is characterized in that, in the reception apparatus of the third aspect, the control unit executes a process in response to an input to a data screen displayed on the display unit based on the data signal separated by the signal separating unit and, when there is a script in a course of the process and a predetermined script command is included in the script, executes the process by skipping the script command not to be executed.

The present invention according to a tenth aspect is characterized in that, in the reception apparatus of the ninth aspect, the control unit controls the display unit to display that there is the script command skipped after the process is ended.

The present invention according to an eleventh aspect is characterized in that the reception apparatus of the third aspect further includes a memory, and the control unit executes a process in response to an input to a data screen displayed on the display unit based on the data signal separated by the signal separating unit and, when there is a script including a script command to execute writing information in the memory in a course of the process, replicates a writing area designated by the script command into another area of the memory so as to execute a process based on the script command in the replicated writing area.

The present invention according to a twelfth aspect is characterized in that, in the reception apparatus of the eleventh aspect, the control unit overwrites the writing area designated by the script command with data of the replicated writing area, when the authentication of the stream is succeeded by the authentication process unit.

The present invention according to a thirteenth aspect is characterized in that, in the reception apparatus of the eleventh aspect, the control unit discards the replicated writing area, when the authentication of the stream is failed by the authentication process unit.

Advantageous Effects on Invention

The reception apparatus in accordance with the present invention restricts execution of a script included in a data signal, while not restricting outputs based on image data or audio data during authentication of the stream. Thereby, it is possible to play contents in a safe manner by preventing execution of a malicious script, without inflicting stress on a user due to restriction in viewing the stream.

BRIEF DESCRIPTION OF DRAWINGS

FIG. 1 is a functional block diagram illustrating a constitution of a main section of a reception apparatus in accordance with a first embodiment of the present invention;

FIG. 2 is a schematic diagram exemplifying displays on a display unit of the reception apparatus in accordance with the first embodiment;

FIG. 3 is an exemplary view of BML;

FIG. 4 is a diagram illustrating an operation of the reception apparatus when it receives BML shown in FIG. 3 in accordance with the first embodiment;

FIG. 6 is a table exemplifying script commands whose execution is restricted during authentication of a stream by a reception apparatus in accordance with a third embodiment of the present invention;

FIG. 7 is a schematic diagram exemplifying displays on a display unit of the reception apparatus in accordance with the third embodiment;

FIG. 8 is a functional block diagram illustrating a constitution of a main section of a reception apparatus in accordance with a fourth embodiment of the present invention;

Figure 5:
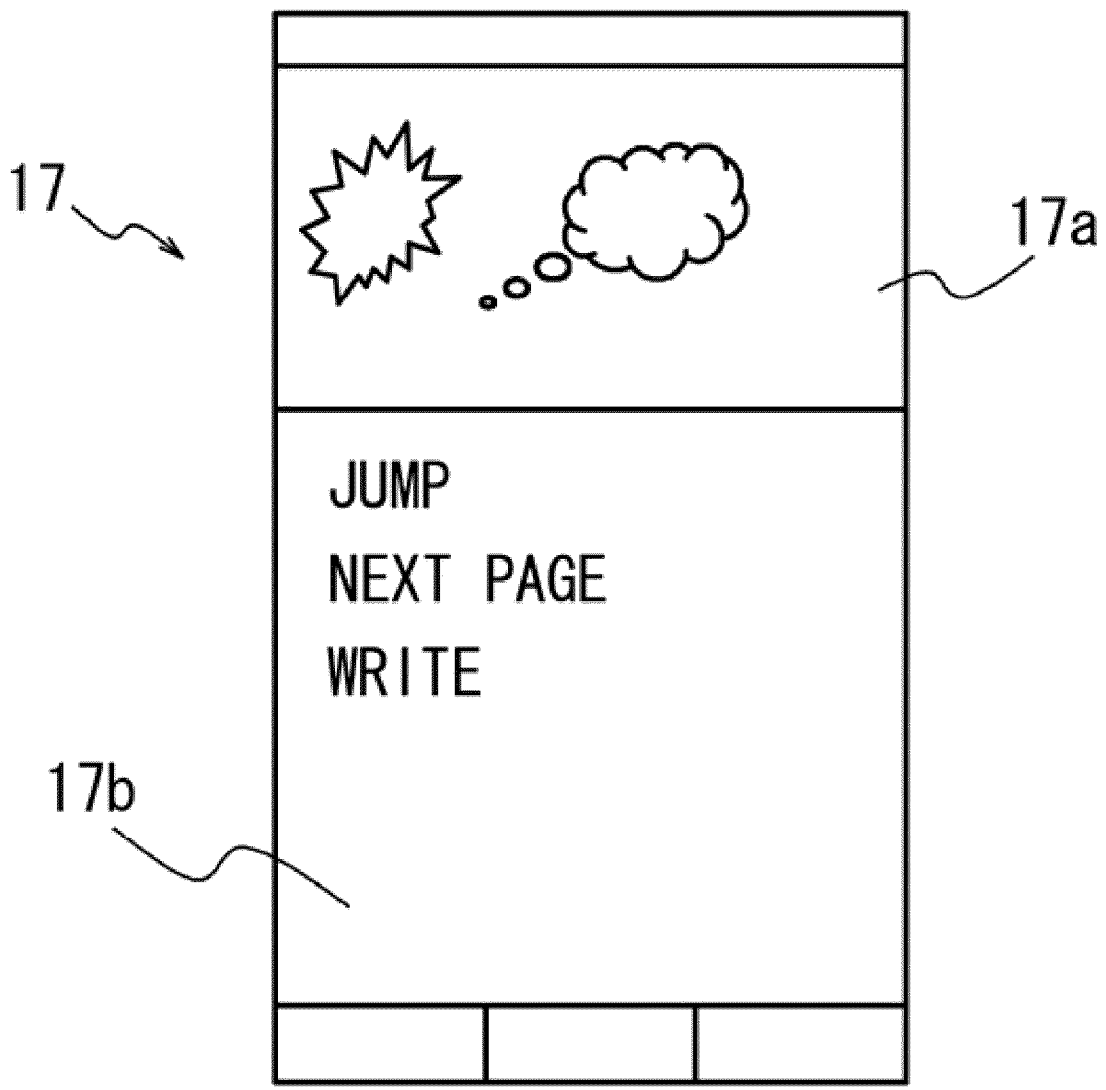
FIG. 5 is a diagram illustrating an operation of a reception apparatus in accordance with a second embodiment of the present invention.

REFERENCE SIGNS LIST 10, 30 reception apparatus
11 broadcast reception antenna
12 broadcast reception unit
13 authentication process unit
14 signal separating unit
15 contents reproduction unit
16 script detection unit
17 display unit
17a image display area
17b data broadcast display area
18 speaker
19 input unit
19a selection key
20 memory
21 communication unit
22 communication antenna
23 control unit

DESCRIPTION OF EMBODIMENTS

Embodiments of the present invention will be described with reference to the accompanying drawings.

First Embodiment

FIG. 1 is a functional block diagram illustrating a constitution of a main section of a reception apparatus in accordance with a first embodiment of the present invention. A reception apparatus 10 in accordance with the present embodiment constitutes a cell phone terminal, for example, capable of receiving One-segment broadcasting of Digital Terrestrial Television and is provided with a broadcast reception antenna 11, a broadcast reception unit 12, an authentication process unit 13, a signal separating unit 14, a contents reproduction unit 15, a script detection unit 16, a display unit 17, a speaker 18, an input unit 19, a memory 20, a communication unit 21, a communication antenna 22, and a control unit 23 for controlling an entire operation.

The input unit 19 has a variety of operation keys such as a numerical keypad and directional keys constituted of mechanical keys or touch panel keys. A predetermined operation key of the input unit 19 is assigned as a selection key 19a for selecting an element (a notation name) to execute a script displayed on the display unit 17 by data broadcast included in One-segment broadcasting.

The control unit 23 controls the broadcast reception unit 12 to receive contents of a desired broadcast channel via the broadcast reception antenna 11 and the authentication process unit 13 to decrypt and authenticate a stream of the contents.

Here, since the stream received is a safe stream transmitted from a specified sender in a case where an authentication of the stream is succeeded, the control unit 23 controls as conventionally such that the signal separating unit 14 separates the stream decrypted by the authentication process unit 13 into an image signal, an audio signal and a data broadcast, which is a data signal, the contents reproduction unit 15 decodes each of the signals, and then display unit 17 displays the image and data while the speaker 18 outputs the audio.

Thereby, a user can view the desired broadcast channel received by the broadcast reception unit 12. Also, in response to an operation of the input unit 19 by a user, the control unit 23 executes a process in accordance with an input to a data screen displayed on the display unit 17 based on the data broadcast. Specifically, the control unit 23 executes, for example, a script to jump to a linked external destination from the communication unit 21 via the communication antenna 22. The memory 20 stores programs to execute a variety of applications, view reserved data, schedule and addresses, as well as securing a work area to execute the programs.

The control unit 23 of the reception apparatus 10 in accordance with the present embodiment, during the authentication of the stream by the authentication process unit 13, displays the image and the data on the display unit 17 while outputting the sounds from the speaker 18, at a point where the contents can be viewed (at a point where each of the signals separated from the stream is decoded). In addition, during the authentication of the stream, the script detection unit 16 analyzes the data broadcast separated by the signal separating unit 14 to detect a script. In a case where a script is detected, the control unit 23 controls the display unit 17 to display an element to execute the script, while prohibiting a selection input to the element (input related to execution of the script) so as not to execute the process (script) in accordance with the element.

FIG. 2 is a schematic diagram exemplifying displays on the display unit 17 of the reception apparatus 10 in accordance with the present embodiment. Here, the display unit 17 has a display area in a vertically long shape with an image display area 17a in the upper part and a data broadcast display area 17b in the lower part. First, at a point to start receiving the contents, the control unit 23 controls the display unit 17 to display a message "Acquiring Data Broadcast" on the data broadcast display area 17b as shown in FIG. 2(a) and the authentication process unit 13 to start authentication of the stream. It is to be noted that, at the point to start receiving, the control unit 23 may control the display unit 17 to display a message "Authentication In Progress" on the image display area 17a as necessary.

Subsequently, at a point where the contents can be viewed by the stream received, the control unit 23 controls such that, even if the stream is not authenticated, the image and a screen of the data broadcast are displayed on the image display area 17a and the data broadcast display area 17b, respectively, as shown in FIG. 2(b).

Then, in a case where the authentication of the stream is succeeded by the authentication process unit 13, the control unit 23 maintains displays of the image and the data broadcast on the display unit 17, as shown in FIG. 2(c). On the contrary, in a case where the authentication of the stream is failed by the authentication process unit 13, the control unit 23 halts displaying the image and the data broadcast on the display unit 17 as shown in FIG. 2(d) at that point and displays a message "Fraudulent Broadcast" on each of the image display area 17a and the data broadcast display area 17b to inform the user accordingly.

In a case where the script is detected by the script detection unit 16 during the authentication of the stream, the control unit 23 controls the display unit 17 to display the element to execute the script, while prohibiting the selection input to the element (input related to execution of the script) so as not to execute the process (script) in accordance with the element.

For example, when BML (Broadcast Markup Language) of the data broadcast received is described as shown in FIG. 3, notation names "Jump", "Next Page" and "Write" of the elements to execute the scripts are displayed in a selectable state (underlined in the figure) on the data broadcast display area 17b of the display unit 17, as shown in FIG. 4(a). During the authentication of the stream, however, even if the selection key 19a of the input unit 19 is operated to perform the select input (click) to one of the elements (notation names), reception of the selection input to the element is prohibited and a message "Unexecutable Due To Unauthenticated State" is displayed on the data broadcast display area 17b as shown in FIG. 4(b) to inform the user accordingly. It is to be noted that FIGS. 4(a) and (b) together exemplify a case where the "Jump" is selected.

As described above, since the reception apparatus 10 in accordance with the present embodiment always displays the image and the data and outputs the audio even during the authentication of the contents, the user can immediately view the contents of the desired broadcast channel the user has selected, which inflicts no stress on the user. Moreover, the reception of the selection input to the element is prohibited so as not to execute the script during the authentication of the stream although the element to execute the script is selectably displayed. Therefore, it will not subject the user to a disadvantage even if the user operates to select the element on BML.

Second Embodiment

A reception apparatus in accordance with a second embodiment of the present invention is configured such that, in the reception apparatus 10 in accordance with the first embodiment described above, when a script is detected by the script detection unit 16 during the authentication of the stream by the authentication process unit 13, the control unit 23 controls such that an element (notation name) to execute the script is displayed on the display unit 17 in a non-selectable state, thereby prohibiting an input related to execution of the script so as not to execute the script. Other operations are the same as those of the first embodiment.

More specifically, when the data broadcast of BML shown in FIG. 3 is received, for example, the control unit 23 controls such that the notation names "Jump", "Next Page" and "Write" of the elements to execute the scripts are displayed in the non-selectable state (not underlined in the figure) on the data broadcast display unit 17b during the authentication of the stream, as shown in FIG. 5.

Thus, with the reception apparatus 10 in accordance with the present embodiment as well, the user can immediately view the contents of the desired broadcast channel the user has selected, which inflicts no stress on the user. Moreover, since the elements to execute the scripts are unselectably displayed during the authentication of the stream so as not to execute the scripts, it will not subject the user to the disadvantage.

Third Embodiment

A reception apparatus in accordance with a third embodiment of the present invention is configured such that, in the reception apparatus 10 shown in FIG. 1, the control unit 23 controls the script detection unit 16 to detect a predetermined script command whose execution is restricted during the authentication of the stream by the authentication process unit 13. In a case where the predetermined script command is detected, the control unit 23 controls the display unit 17 to display the element (notation names) to execute the script including the script command in the non-selectable state on the data broadcast display area 17b, in the same manner as the second embodiment. Thereby, the control unit 23 prohibits the input related to execution of the script command so as not to execute the script command.

Here, the predetermined script command whose execution is restricted during the authentication of the stream is a command having a great influence on the user if the stream received is falsified, for example, as shown in FIG. 6. For the purpose of reference, FIG. 6 shows corresponding functions of the script commands (function name) as well. Those script commands whose execution is restricted are stored in the script detection unit 16 or the memory 20 in advance and compared to the script command actually detected in the script detection unit 16, so as to determine whether the script command detected is the one whose execution is restricted.

Thus, when the data broadcast of BML shown in FIG. 3 is received, for example, the image is displayed on the image display area 17a of the display unit 17, as shown in FIG. 7(a), at a point where the contents can be viewed by the stream received during the authentication of the stream. With regard to the data broadcast, however, since the elements shown by the notation names "Jump" and "Write" include the script commands whose execution is restricted, which are detected by the script detection unit 16, those elements are displayed in the non-selectable state on the data broadcast display area 17b. On the other hand, the element of "Next Page" does not include the script command whose execution is restricted and thus is displayed in the selectable state. Then, when the authentication of the stream is succeeded, the control unit 23 controls all of the elements to be displayed in the selectable state, as shown in FIG. 7(b).

Thus, not only being able to obtain the same effects as those of the embodiments described above, the reception apparatus 10 in accordance with the present embodiment also improves usability, since the user can select the element to execute the script (for example, "Next Page" to move between pages within a terminal) including the script command with no possibility to inflict a serious damage on the user and execute its function during the authentication of the stream.

Fourth Embodiment

FIG. 8 is a functional block diagram illustrating a constitution of a main section of a reception apparatus in accordance with a fourth embodiment of the present invention. A reception apparatus 30 of the present embodiment is designed similarly to the reception apparatus 10 shown in FIG. 1 but does not have the script detection unit 16.

Thus, during the authentication of the stream, the control unit 23 of the reception apparatus 30 in accordance with the present embodiment controls the display unit 17 to display the data screen based on the data broadcast received, without any restriction to display, on the data broadcast display area 17b as shown in FIG. 4(a), for example, and executes a process in response to an input (selection of the element) to the data screen by the input unit 19. Then, when it is determined that there is a script in the course of the process, the control unit 23 halts the process without executing the script. In such a case, the message "Unexecutable Due To Unauthenticated State" is displayed on the data broadcast display area 17b to inform the user accordingly, as shown in FIG. 4(b).

Accordingly, with the reception apparatus 30 in accordance with the present embodiment as well, it is possible to obtain the same effect as that of the reception apparatus 10 in accordance with the first embodiment.

Fifth Embodiment

A reception apparatus in accordance with a fifth embodiment of the present invention is configured such that, in the reception apparatus 30 shown in FIG. 8, the script command shown in FIG. 6, whose execution is restricted during the authentication of the stream is stored in the memory 20. In the same manner as the fourth embodiment, the control unit 23, during the authentication of the stream, controls the display unit 17 to display the data screen based on the data broadcast received on the data broadcast display area 17b, and executes the process in response to an input (selection of the element) to the data screen by the input unit 19. Then, when it is determined in the course of the process that there is a script and the script includes a predetermined script command stored in the memory 20, whose execution is restricted, the control unit 23 halts the process without executing the predetermined script command.

Figure 9:
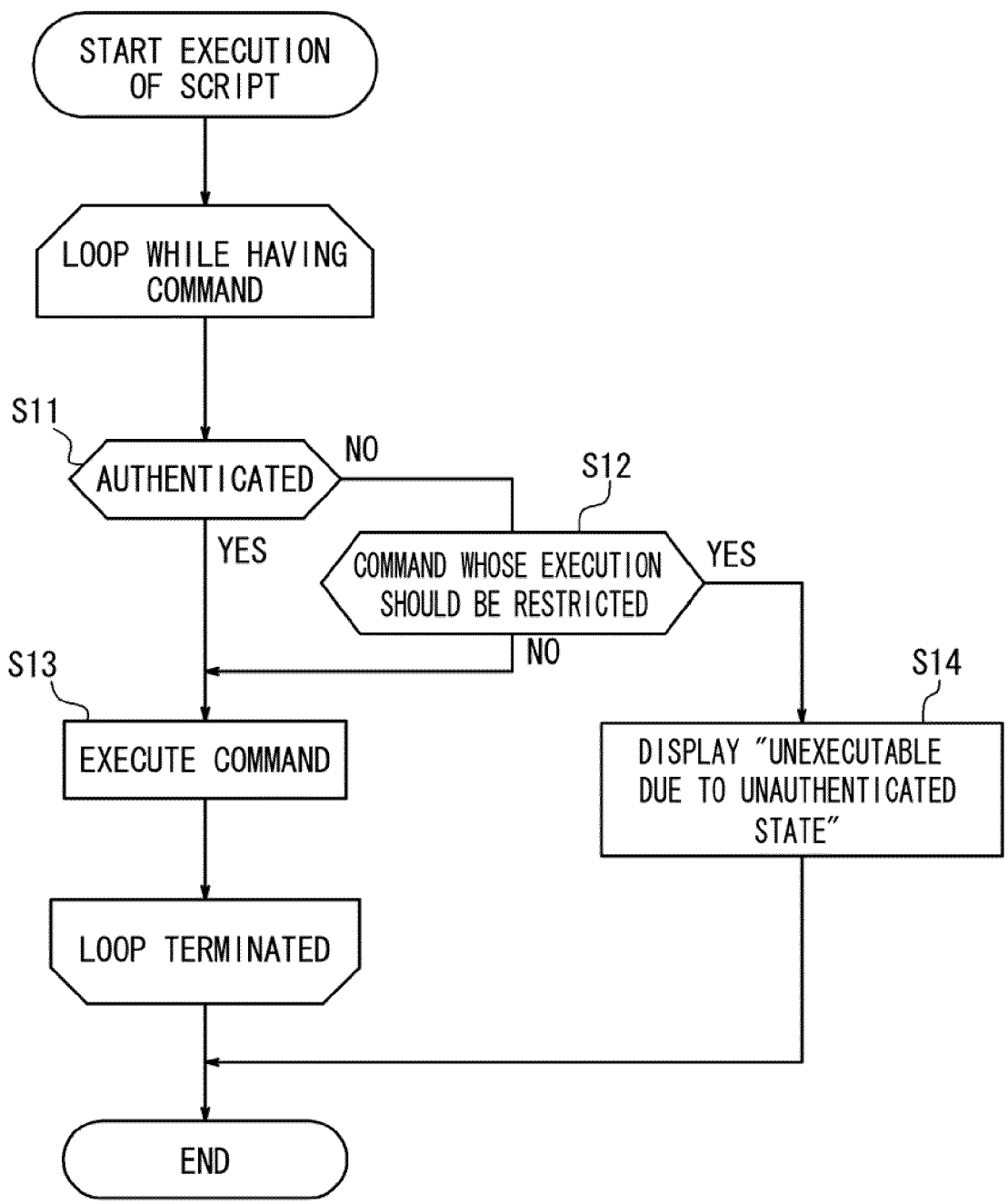
FIG. 9 is a flow chart illustrating an operation of a main section of a script execution process by a reception apparatus in accordance with a fifth embodiment of the present invention.

FIG. 9 is a flow chart showing a script execution process by the reception apparatus 30 in accordance with the present embodiment. When the element (notation name) to execute the script selectably displayed on the data broadcast display area 17b of the display unit 17 is selected by the selection key 19a of the input unit 19, the control unit 23 starts a process of the element. In a case where the script command is detected in the course of the process of the element, it is first determined whether the authentication of the stream is completed by the authentication process unit 13 (step S11).

When the authentication of the stream is still in progress as a result, the control unit 23 determines whether the script command to be executed is a command whose execution should be restricted, by comparing to the script commands whose execution is restricted, stored in the memory 20 (step S12) and, when the script command is not one of the script commands whose execution is restricted, executes the script command even during the authentication of the stream (step S13).

On the contrary, in a case where the authentication of the stream is still in progress and the script command is one of the script commands whose execution is restricted, the control unit 23 controls the display unit 17 to display the message "Unexecutable Due To Unauthenticated State" on the data broadcast display area 17b (step S14) to inform the user accordingly and ends (halts) the process of the element selected without executing the script command.

For example, when the element "Jump" is selected during the authentication of the stream as shown in FIG. 4(a), since the "Jump" includes "launchDocument(http:)", which is the script command whose execution is restricted, that is, a link to an external site beginning with "http:", the control unit 23 halts the process without executing the script command. Then, the control unit 23 controls the display unit 17 to display the message "Unexecutable Due To Unauthenticated State" on the data broadcast area 17b, as shown in FIG. 4(b), to inform the user accordingly. The above process is repeated for each script command to execute.

In a case where the authentication of the stream has already completed at the step S11, the control unit 23 executes all of the script commands (step S13).

As described above, the reception apparatus 30 in accordance with the present embodiment executes the process in response to the input (selection of the element) to the data screen displayed on the display unit 17 based on the data broadcast while displaying the image received on the display unit 17 during the authentication of the stream and, in a case where there is the script in the course of the process and the script includes the predetermined script command whose execution is restricted during the authentication, halts the process without executing the script command. Thereby, it is possible to prevent the stress caused by being not able to view a desired contents or the disadvantage caused by execution of a malicious script on the user as well as to execute the script not including the script command whose execution is restricted, which improves the usability.

Sixth Embodiment

The reception apparatus in accordance with a sixth embodiment of the present invention is configured such that, in the reception apparatus 30 in accordance with the fifth embodiment described above, in a case where it is determined that, in the course of executing a process in response to an input (selection of the element) to the data screen displayed on the display unit 17 during the authentication of the stream by the authentication process unit 13, a script command to be executed is the script command whose execution is restricted, the control unit 23 suspends the process just before executing the script command. Then, when the authentication of the stream is succeeded, the control unit 23 resumes the process suspended, while terminating the process suspended by force if the authentication is failed.

Figure 10:
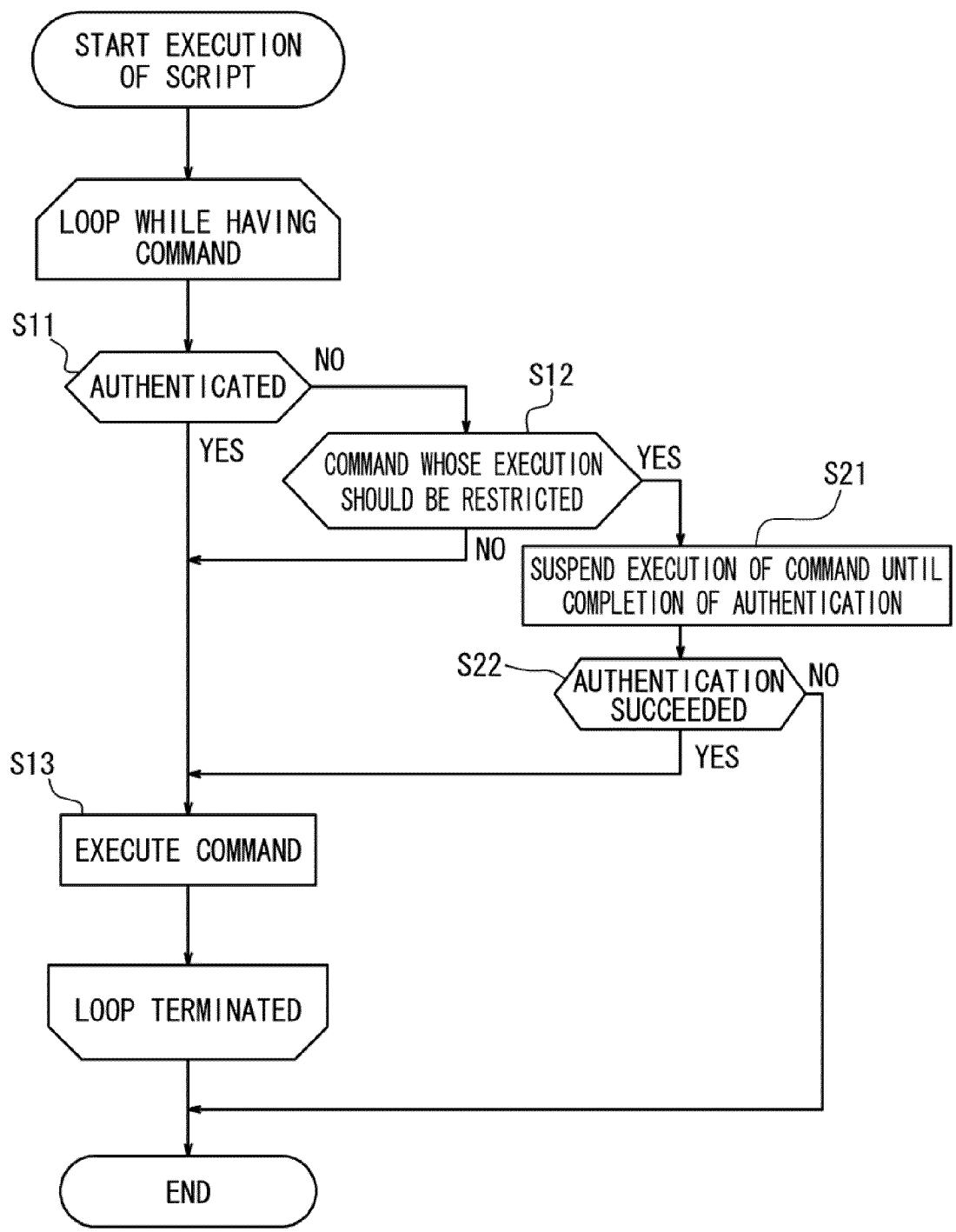
FIG. 10 is a flow chart illustrating an operation of a main section of a script execution process by a reception apparatus in accordance with a sixth embodiment of the present invention.

FIG. 10 is a flow chart showing an operation of a main section of a script execution process by the reception apparatus 30 in accordance with the present embodiment. As shown in FIG. 10, in a case where it is determined that, in the course of the process of the script whose execution is started during the authentication of the stream, the script command to be executed is the script command whose execution is restricted (steps S11, S12), the control unit 23 suspends the process just before executing the script command without executing the script command until the authentication is completed (step S21). In such a case, the control unit 23 controls the display unit 17 to display the message "Authentication In Progress" on the data broadcast display area 17b, so as to inform the user accordingly.

Then, at a point where the authentication of the stream is completed with success (step S22), the control unit 23 executes the script command suspended (step S13) to resume the process suspended. In a case where the authentication is failed, the control unit 23 terminates the process by force without executing either the script command suspended or the following processes. Other operations are the same as those in the flow chart of the fifth embodiment shown in FIG. 9.

Figure 11:
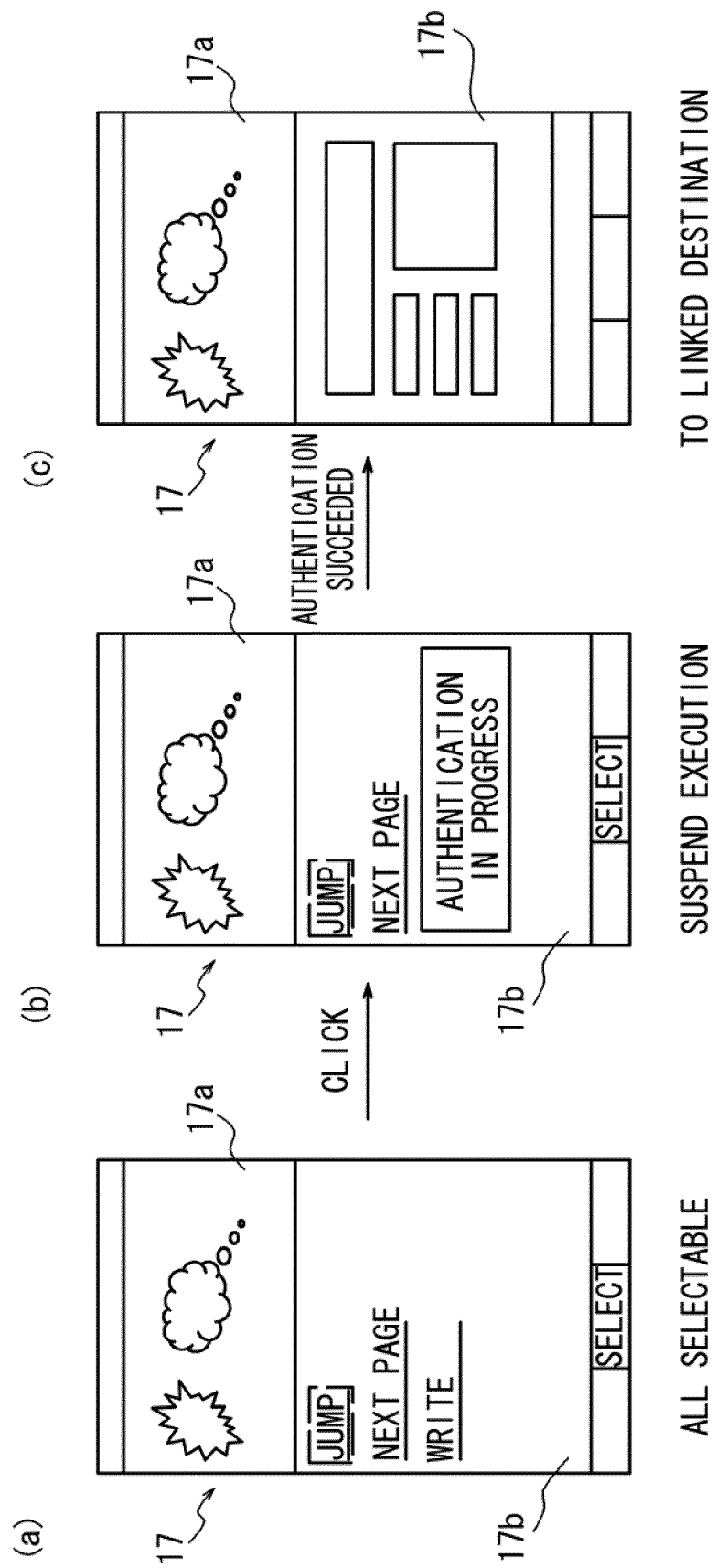
FIG. 11 is a schematic diagram exemplifying displays on a display unit of the reception apparatus in accordance with the sixth embodiment.

Thus, for example, when the data broadcast of BML shown in FIG. 3 is received, the notation names of the elements "Jump", "Next Page" and "Write" to execute the scripts are displayed in the selectable state on the data broadcast display area 17b of the display unit 17, as shown in FIG. 11(a), at a point where the data broadcast can be displayed during the authentication of the stream. In addition, for example, when a select input of the "Jump" is performed (clicked) in this state, since the "Jump" includes the script command whose execution is restricted, "launchDocument("http:)", the process is suspended just before executing the script command and the message "Authentication In Progress" is displayed on the data broadcast display area 17b of the display unit 17, as shown in FIG. 11(b), so as to inform the user accordingly. Then, at the point where the authentication is succeeded, the process suspended is resumed and the script command is automatically executed to display a linked webpage, as shown in FIG. 11(c).

As described above, in a case where it is determined that, in the course of execution of the process in response to the input (selection of the element) to the data screen displayed on the display unit 17 during the authentication of the stream, the script command to be executed is the script command whose execution is restricted, the reception apparatus 30 in accordance with the present embodiment suspends the process just before executing the script command. Then, at the point where the authentication of the stream is succeeded, the reception apparatus 30 automatically resumes the process suspended, while forcing a termination of the process suspended if the authentication is failed. Thereby, the user can select a desired process (element) during the authentication of the stream, which improves the usability even more.

Seventh Embodiment

The reception apparatus in accordance with a seventh embodiment of the present invention is configured such that, in the reception apparatus 30 in accordance with the fifth embodiment described above, in a case where it is determined that, in the course of execution of a process in response to an input (selection of the element) to the data screen displayed on the display unit 17 during the authentication of the stream by the authentication process unit 13, the script command to be executed is the script command whose execution is restricted, the control unit 23 skips the script command and writes accordingly in the memory 20. Then, at a point where a sequence of processes in response to the input are finished, the control unit 23 controls the display unit 17 to display that there is a command which cannot be executed on the data broadcast display area 17b.

Figure 12:
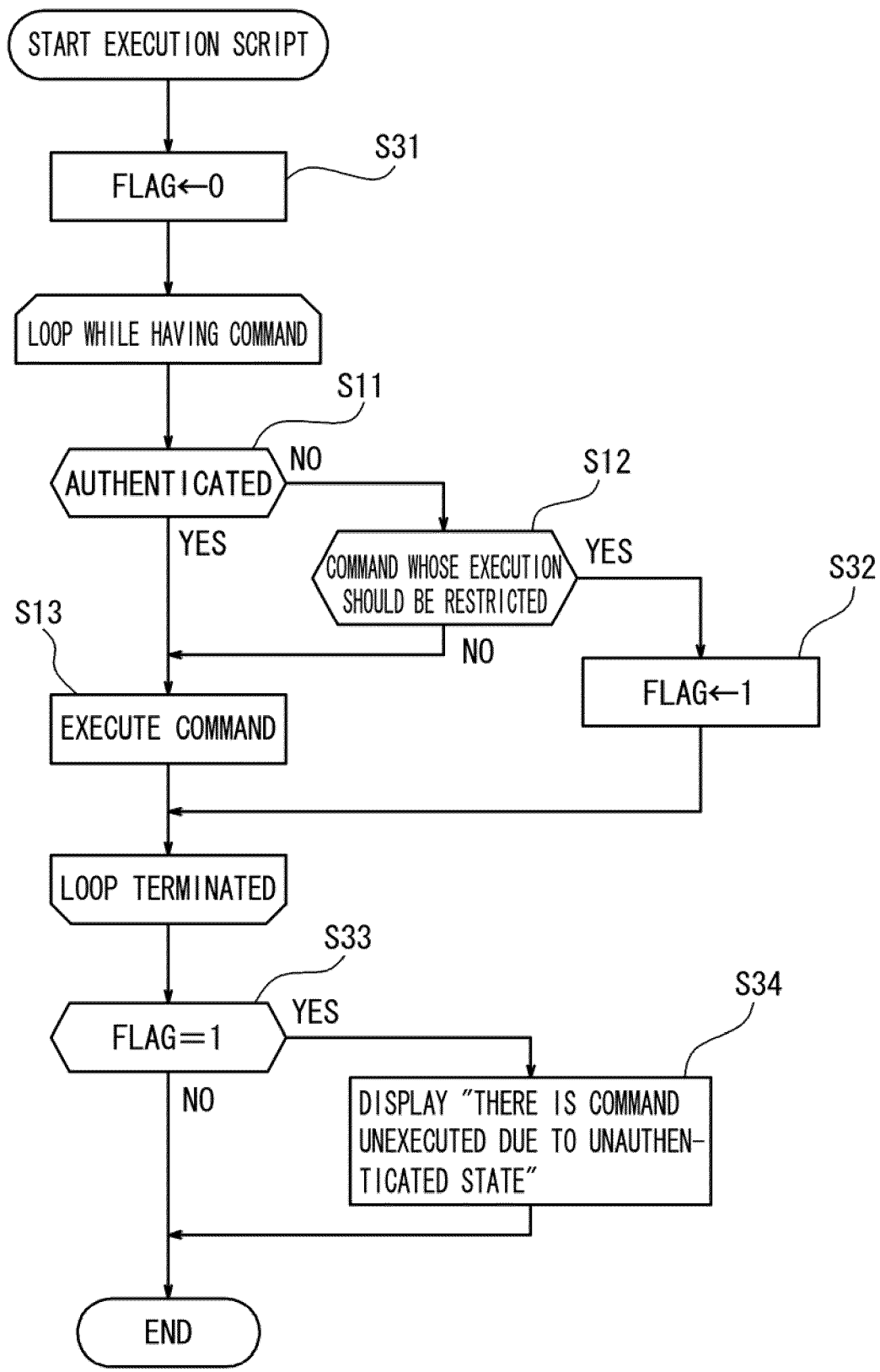
FIG. 12 is a flow chart illustrating an operation of a main section of a script execution process by a reception apparatus in accordance with a seventh embodiment of the present invention.

FIG. 12 is a flow chart showing an operation of a main section of a script execution process by the reception apparatus 30 in accordance with the present embodiment. As shown in FIG. 12, when the element displayed on the display unit 17 is selected to start execution of the script, the control unit 23 first resets a flag (FLAG) for determining whether there is a command which cannot be executed in a predetermined area of the memory 20 to "0" (step S31). Then, as described with reference to the flow chart shown in FIG. 9, in a case where it is determined that, during the authentication of the stream, the script command to be executed is the script command whose execution is restricted (steps S11, S12), the control unit 23 sets the FLAG to "1" (step S32), skips the script command without executing it and continues the process. That is, the control unit 23 does not execute only the script command whose execution is restricted but executes a series of processes of the element including the other script commands to the end.

Consequently, at a point where the series of processes of the element selected are finished, the control unit 23 determines whether FLAG is "1" (step S33) and, in a case where FLAG is "1", controls the display unit 17 to display the message "There Is Command Which Cannot Be Executed Due To Unauthenticated State" on the data broadcast display area 17b (step S34) and informs the user accordingly, while ending the process as it is in a case where FLAG is "0". Other operations are the same as those in the flow chart of the fifth embodiment shown in FIG. 9.

Figure 13:
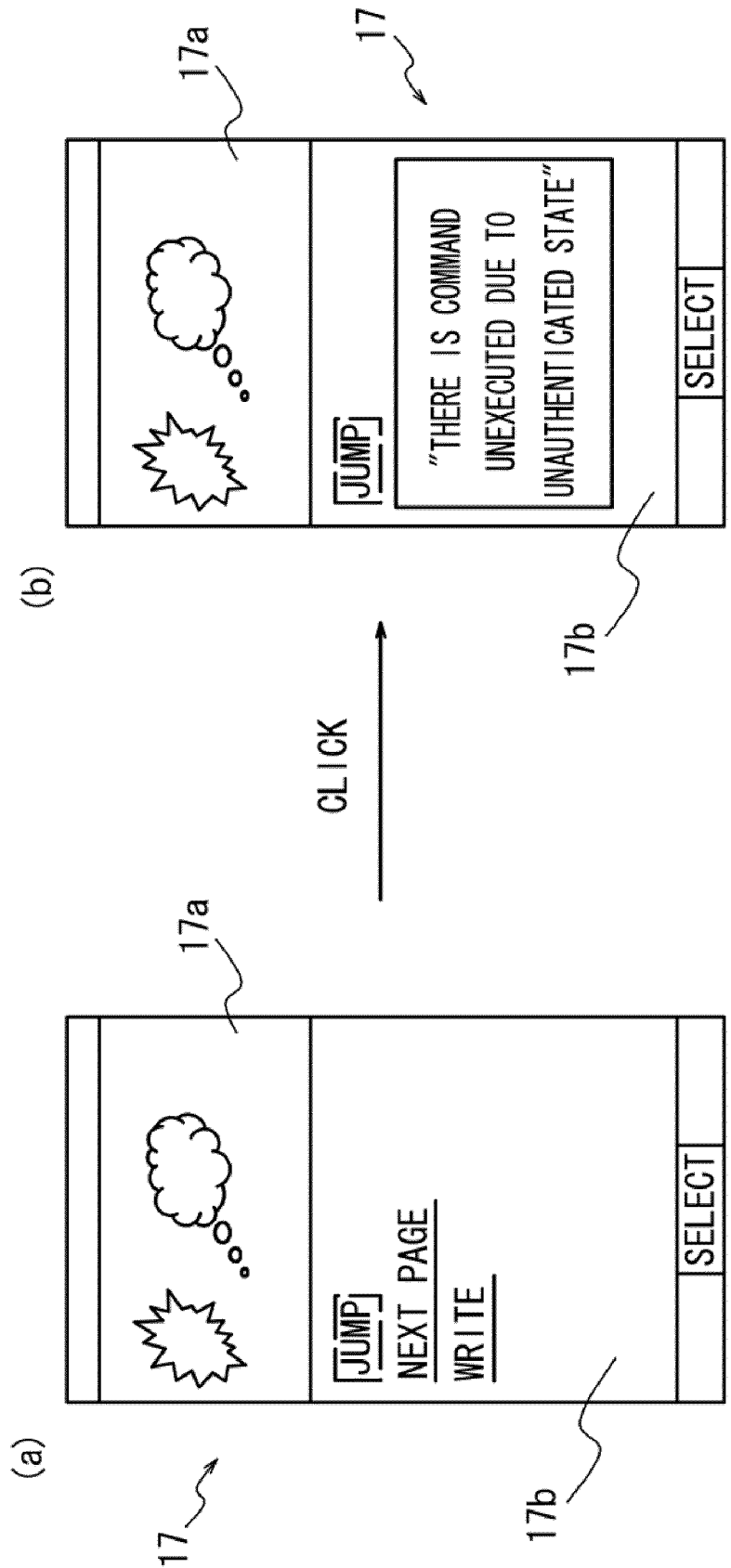
FIG. 13 is a schematic diagram exemplifying displays on a display unit of the reception apparatus in accordance with the seventh embodiment.

Thereby, for example, when the data broadcast of BML shown in FIG. 3 is received, all of the notation names of the elements "Jump", "Next Page" and "Write" to execute the scripts are displayed in the selectable state on the data broadcast display area 17b of the display unit 17 at a point where the data broadcast can be displayed during the authentication of the stream, as shown in FIG. 13(a). In addition, for example, when the select input of the "Jump" is performed (clicked) in this state, since the "Jump" includes the script command whose execution is restricted, "launchDocument("http:)", execution of the script command is skipped (it proceeds to a next process without executing the script command). Then, at the point where a series of processes of the element (script) to which the selection input is performed are completed, a message "There Is Command Which Cannot Be Executed Due To Unauthenticated State" is displayed on the data broadcast display area 17b of the display unit 17 to inform the user accordingly, as shown in FIG. 13(b).

As described above, in a case where it is determined that, in the course of execution of the process in response to the input (selection of the element) to the data screen displayed on the display unit 17 during the authentication of the stream, the script command to be executed is the script command whose execution is restricted, the reception apparatus 30 in accordance with the present embodiment skips execution of the script command and executes the series of processes to the end and, at a point where the processes are completed, informs the user that there is a script command which cannot be executed. Thus, the user can easily know that there is the script command which cannot be executed. Accordingly, the user may select the same process again in such a case, which improves usability.

Eighth Embodiment

A reception apparatus in accordance with an eighth embodiment of the present invention is configured such that, in the reception apparatus 10 in accordance with the third embodiment or the reception apparatus 30 in accordance with the fifth, sixth or seventh embodiment, among the script commands whose execution is restricted during the authentication shown in FIG. 6, execution of access instruction to the memory such as to write in the diary, to write in the address book, to write a number in the memory, and the likes is allowed. Then, in order to execute the script command during the authentication of the stream, the control unit 23 replicates a predetermined writing area designated by the script command into another area in the memory 20 and executes the command using the replicated area. When the authentication of the stream is succeeded later, the control unit 23 overwrites the corresponding predetermined writing area with data of the replicated area and discards the replicated area. In a case where the authentication of the stream is failed, the control unit 23 controls the display unit 17 to display accordingly on the data broadcast display area 17b and discards the replicated area.

Figure 14:
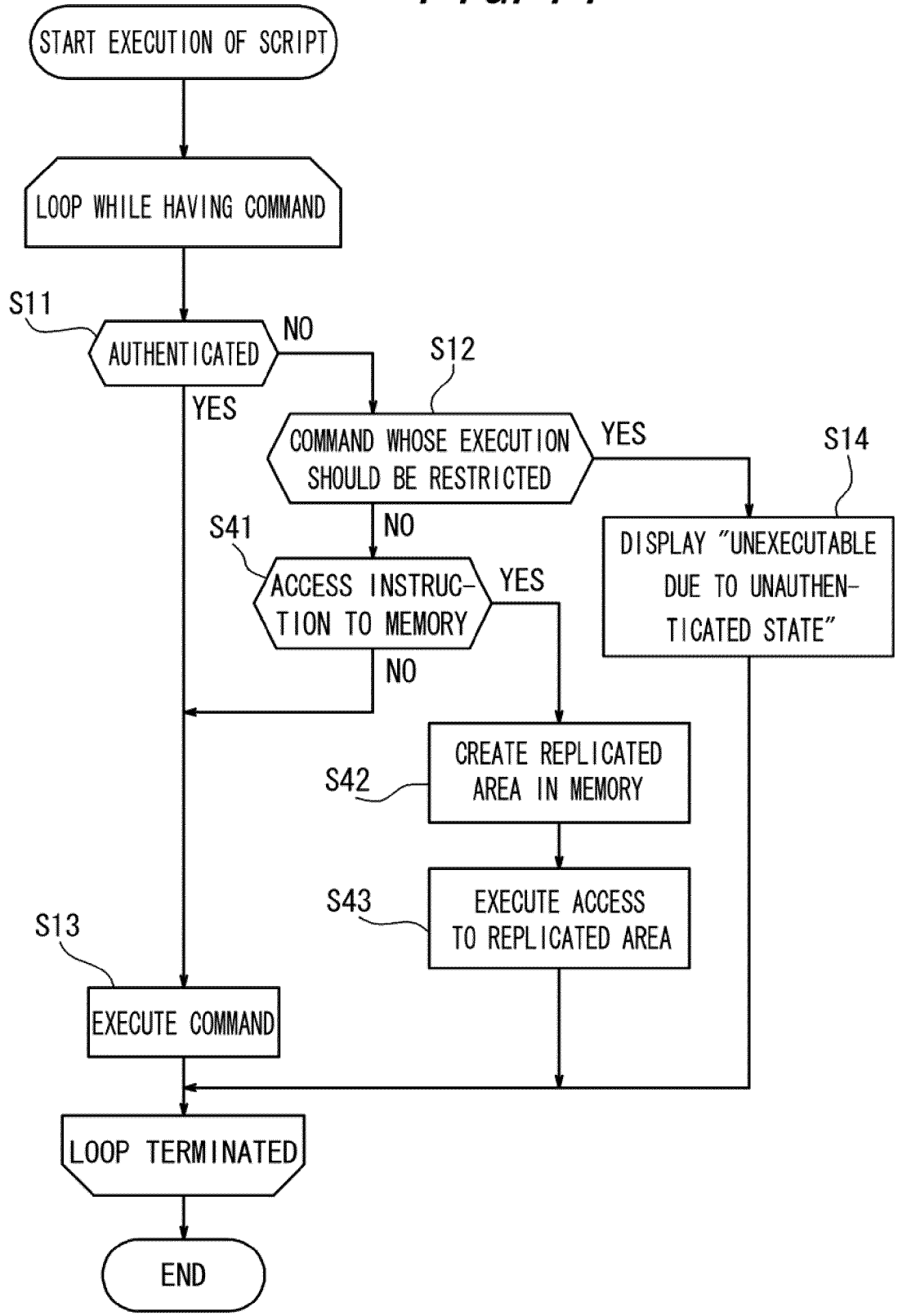
FIG. 14 is a flow chart illustrating an operation of a main section of a script execution process by a reception apparatus in accordance with an eighth embodiment of the present invention.

FIG. 14 is a flow chart showing an operation of a main section of a script execution process by a reception apparatus in accordance with the present embodiment. As shown in FIG. 14, in a case where a script command to be executed is not the script command whose execution is restricted during a process of the script whose execution is started during the authentication of the stream (steps S11, S12), the control unit 23 determines whether the script command is the access instruction to write in the memory 20 (step S41) and, when the script command is not the access instruction, executes the script (step S13).

On the contrary, in a case where it is determined that the script command is the access instruction to the memory 20 at the step S41, the control unit 23 generates a replicated area of a predetermined writing area designated by the access instruction in the memory 20 (step S42) and executes a process as an access to the replicated area (step S43). Other operations are the same as those in the flow chart of the fifth embodiment shown in FIG. 9.

Figure 15:
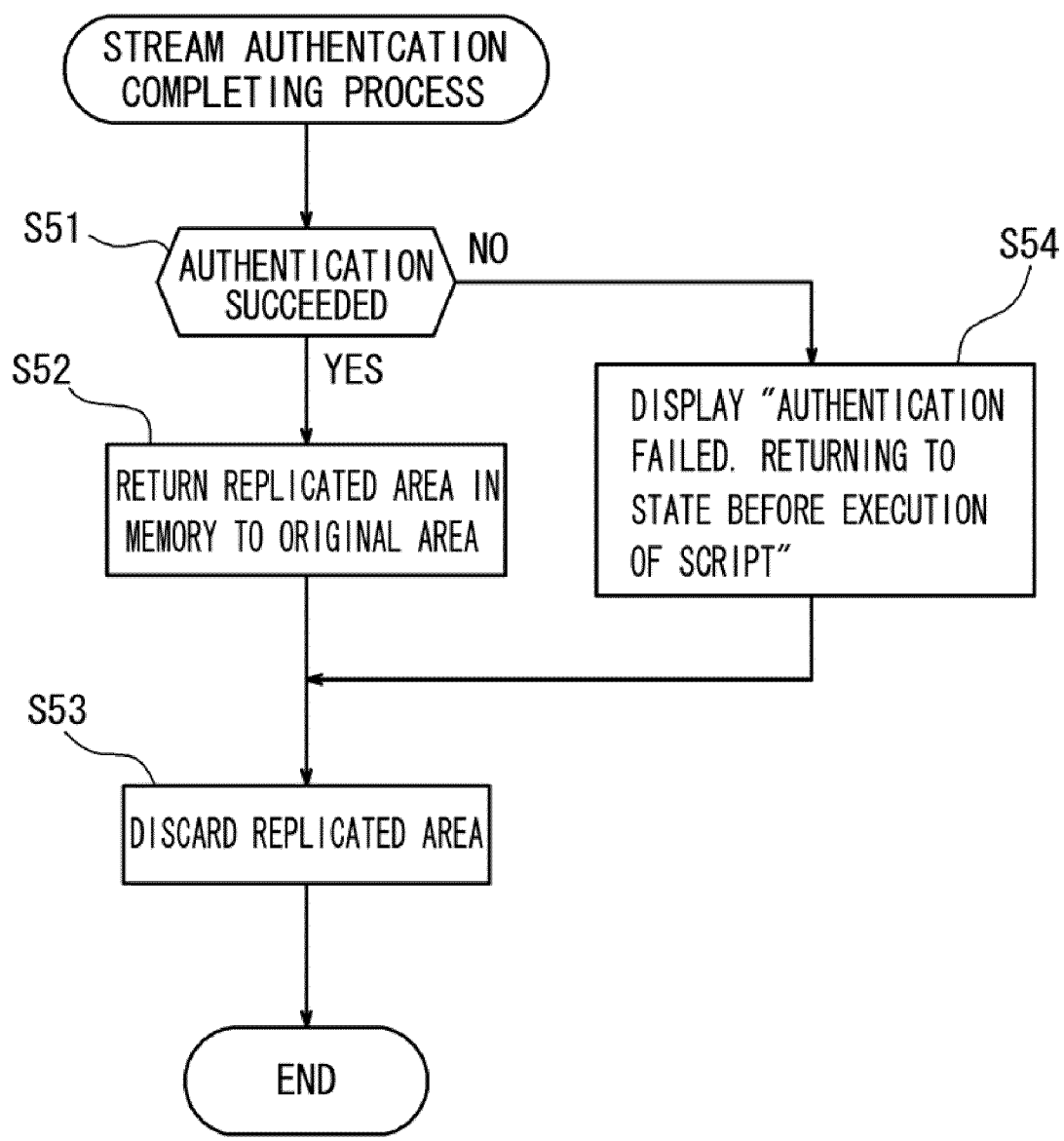
FIG. 15 is a flow chart showing a process after authentication is completed by a reception apparatus in accordance with the eighth embodiment.

Then, when the authentication of the stream is completed by the authentication process unit 13, the control unit 23, depending on a result of the authentication as shown in the flow chart in FIG. 15, overwrites the corresponding predetermined writing area with data of the replicated area in the memory 20 when the authentication of the stream is succeeded (steps S51, S52) and discards the replicated area (step S53).

On the contrary, in a case where the authentication of the stream is failed at the step S51, the control unit 23 controls the display unit 17 to display a message "Authentication Failed. Returning To State Before Execution Of Script." on the data broadcast display area 17b (step S54), for example, so as to notify the user accordingly and discards the replicated area without returning contents of the replicated area in the memory 20 to the corresponding predetermined recording area (step S53).

Figure 16:
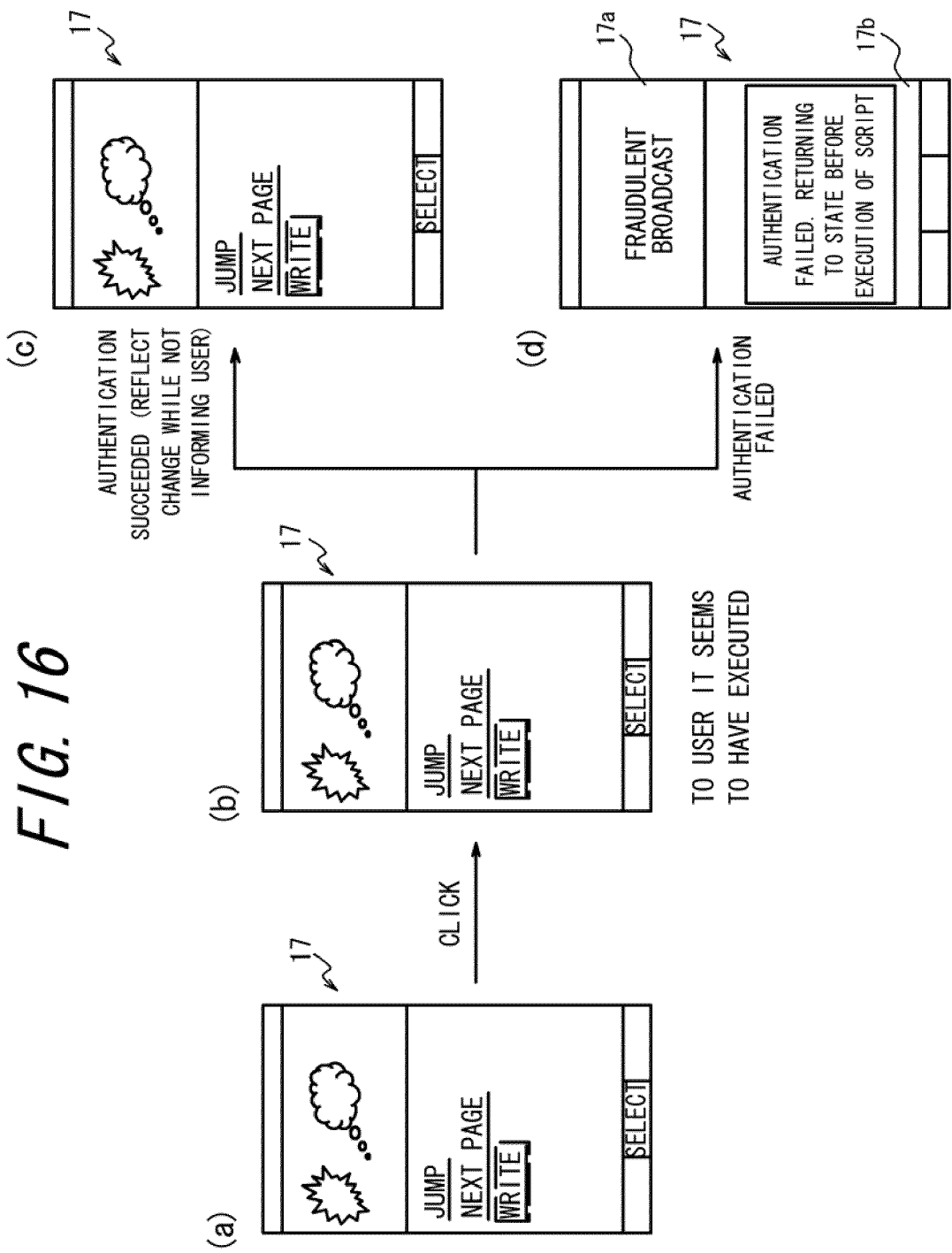
FIG. 16 is a schematic diagram exemplifying displays on a display unit of the reception apparatus in accordance with the eighth embodiment.
Figure 17:
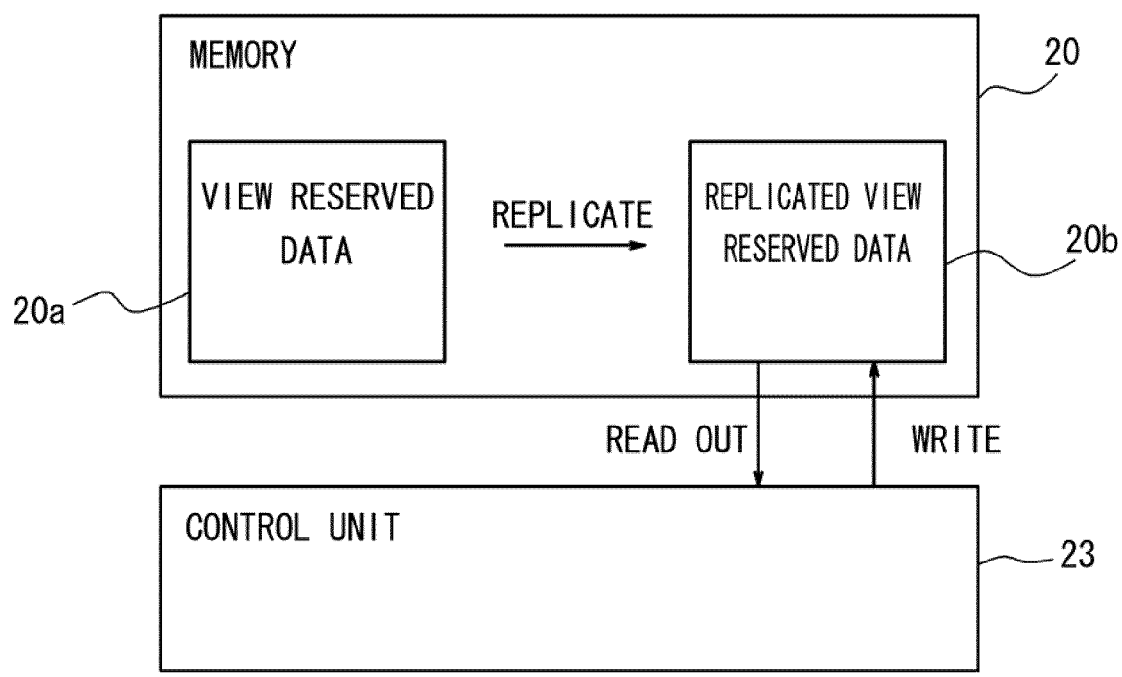
FIG. 17 is a diagram illustrating an example of an operation by the reception apparatus during the authentication in accordance with the eighth embodiment.

Thus, for example, when the element "Write" displayed on the data broadcast display area 17b of the display unit 17 is selected as shown in FIG. 16(a) and a view reserved data is written in the memory 20 during the authentication of the stream, since the access instruction to the memory 20 is included as the script command in the course of the process of the element, a replicated area 20b of a predetermined view reserved data recording area 20a is created in the memory 20 as shown in FIG. 17 such that the view reserved data is written in the replicated area 20b. Thus, to the user, a display screen on the data broadcast display area 17b seems to have executed the script, as shown in FIG. 16(b).

Figure 18:
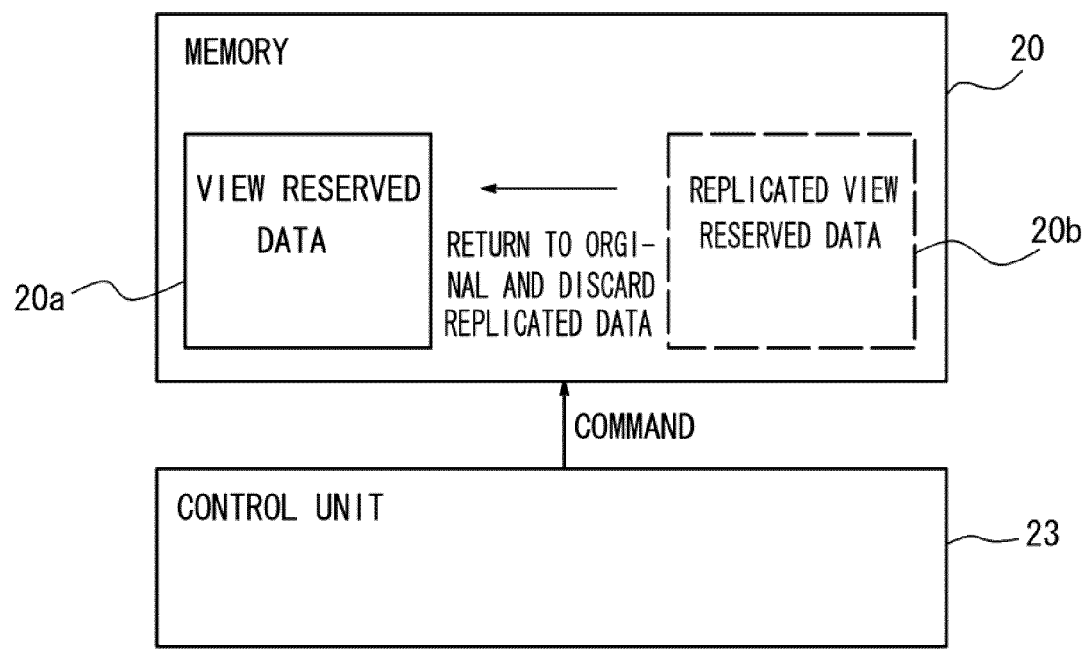
FIG. 18 is a diagram illustrating an example of an operation by the reception apparatus when the authentication is succeeded in accordance with the eighth embodiment.

Then, in a case where the control unit 23 determines that the authentication of the stream is succeeded by the authentication process unit 13, the predetermined view reserved data recording area 20a is overwritten with data of the replicated area 20b in the memory 20 and then the replicated area 20b is discarded, as shown in FIG. 18. In this case, a newly obtained view reserved data is reflected as written to the predetermined view reserved data recording area 20a in the memory 20, although the display unit 17 informs nothing as shown in FIG. 16(c) and performs display in accordance with the stream received by the broadcast reception unit 12.

Figure 19:
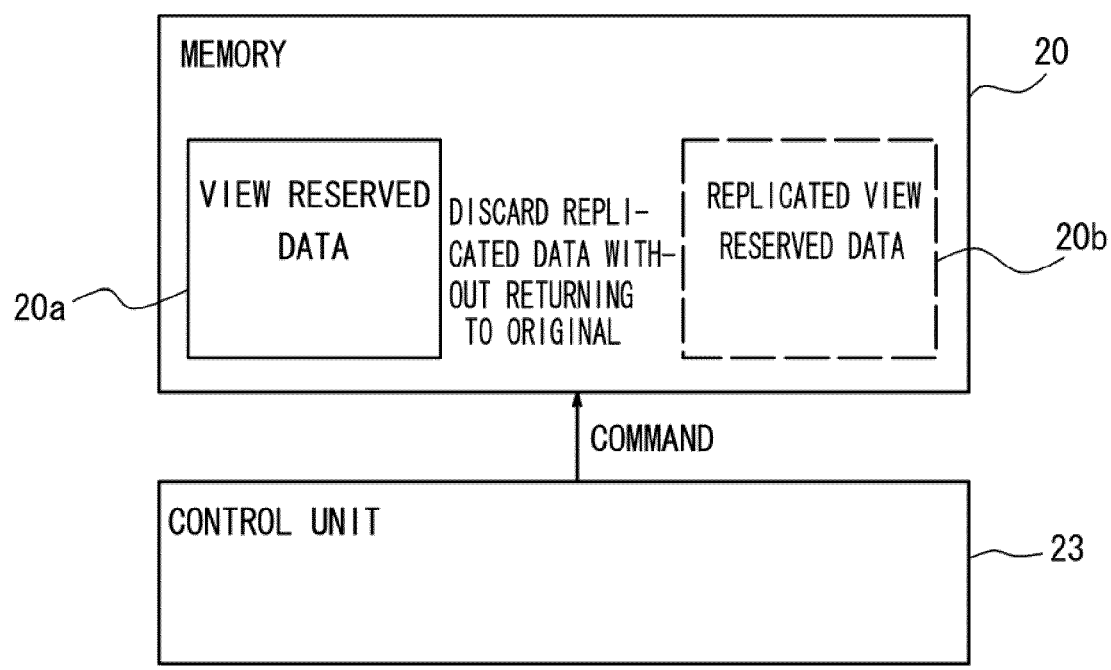
FIG. 19 is a diagram illustrating an example of an operation by the reception apparatus when the authentication is failed in accordance with the eighth embodiment.

On the contrary, in a case where the control unit 23 determines that the authentication of the stream is failed, the replicated area 20b in the memory 20 is discarded without being overwritten to the predetermined view reserved data recording area 20a as shown in FIG. 19, and the display unit 17 displays a message "Fraudulent Broadcast" on the image display area 17a, while displaying the message "Authentication Failed. Returning To State Before Execution Of Script." on the data broadcast display area 17b, as shown in FIG. 16(d).

As set forth above, in a case where the script including the script command to execute writing in the memory 20 is executed during the authentication of the stream, the reception apparatus in accordance with the present embodiment creates the replicated area in the memory 20 and executes the script and, at a point where the authentication is succeeded, returns the replicated area to a regular writing area and discards the replicated area, while discarding the replicated area without returning the replicated area to the regular writing area, in a case where the authentication is failed. Hence, there is no adverse affect on the user when the authentication is failed and, even during the authentication, the user can select the element to execute the script including writing in the memory 20. In addition, the user can reserve a view and the likes without waiting for the authentication to complete, which improves usability even more.

It should be noted that the present invention is not limited to the embodiments but can be varied or modified in a number of manners. For example, since execution of all scripts are prohibited during the authentication of the stream in the first and the second embodiments, it is also possible not to display the element (notation name) itself to execute the script on the display unit 17 during the authentication of the stream. In addition, it is also possible not to display the element (notation name) to execute the script command whose execution is restricted on the display unit 17 so as to prohibit a selection in the third embodiment.

The invention claimed is:

1. A reception apparatus comprising:
   a reception unit for receiving a stream including a data signal;
   a display unit for performing display based on the stream received by the reception unit;
   an authentication process unit for authenticating a sender of the stream received by the reception unit;
   a signal separating unit for separating the data signal from the stream received by the reception unit;
   a script detection unit for detecting a script by analyzing the data signal separated by the signal separating unit; and
   a control unit for controlling the display unit to perform display based on the stream received by the reception unit;
   wherein the control unit prohibits an input related to execution of the script when the script is detected by the script detection unit during authentication of the stream by the authentication process unit.

2. A reception apparatus comprising:
   a reception unit for receiving a stream including a data signal;
   a display unit for performing display based on the stream received by the reception unit;
   an authentication process unit for authenticating a sender of the stream received by the reception unit;
   a signal separating unit for separating the data signal from the stream received by the reception unit;

a script detection unit for detecting a predetermined script command by analyzing the data signal separated by the signal separating unit; and a control unit for controlling the display unit to perform display based on the stream received by the reception unit;

wherein the control unit prohibits an input related to execution of the predetermined script command when the predetermined script command is detected by the script detection unit during authentication of the stream by the authentication process unit.

3. A reception apparatus comprising:

a reception unit for receiving a stream including a data signal;

a display unit for performing display based on the stream received by the reception unit;

an authentication process unit for authenticating a sender of the stream received by the reception unit;

a signal separating unit for separating the data signal from the stream received by the reception unit; and a control unit for controlling the display unit to perform display based on the stream received by the reception unit;

wherein the control unit restricts execution of a script included in the data signal separated by the signal separating unit during authentication of the stream by the authentication process unit.

4. The reception apparatus according to claim 3, wherein the control unit executes a process in response to an input to a data screen displayed on the display unit based on the data signal separated by the signal separating unit and, when there is a script in a course of the process, halts the process without executing the script.

5. The reception apparatus according to claim 3, wherein the control unit executes a process in response to an input to a data screen displayed on the display unit based on the data signal separated by the signal separating unit and, when there is a script in a course of the process and a predetermined script command is included in the script, halts the process without executing the script command.

6. The reception apparatus according to claim 3, wherein the control unit executes a process in response to an input to a data screen displayed on the display unit based on the data signal separated by the signal separating unit and, when there is a script in a course of the process and a predetermined script command is included in the script, suspends the process just before executing the script command.

7. The reception apparatus according to claim 6, wherein the control unit resumes the process suspended, when the authentication of the stream is succeeded by the authentication process unit.

8. The reception apparatus according to claim 6, wherein the control unit terminates the process suspended by force, in a case where the authentication of the stream is failed by the authentication process unit.

9. The reception apparatus according to claim 3, wherein the control unit executes a process in response to an input to a data screen displayed on the display unit based on the data signal separated by the signal separating unit and, when there is a script in a course of the process and a predetermined script command is included in the script, executes the process by skipping the script command not to be executed.

10. The reception apparatus according to claim 9, wherein the control unit controls the display unit to display that there is the script command skipped after the process is ended.

11. The reception apparatus according to claim 3, further comprising a memory, wherein the control unit executes a process in response to an input to a data screen displayed on the display unit based on the data signal separated by the signal separating unit and, when there is a script including a script command to execute writing information in the memory in a course of the process, replicates a writing area designated by the script command into another area of the memory so as to execute a process based on the script command in the replicated writing area.

12. The reception apparatus according to claim 11, wherein the control unit overwrites the writing area designated by the script command with data of the replicated writing area, when the authentication of the stream is succeeded by the authentication process unit.

13. The reception apparatus according to claim 11, wherein the control unit discards the replicated writing area, when the authentication of the stream is failed by the authentication process unit.

* * * * *